(12) United States Patent
Stanley et al.

(10) Patent No.: US 10,150,556 B2
(45) Date of Patent: Dec. 11, 2018

(54) LOW-PROFILE WING HINGE MECHANISM

(71) Applicant: The Boeing Company, Chicago, IL (US)

(72) Inventors: Daniel Christopher Stanley, Ballwin, MO (US); John Hershey Fogarty, Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 327 days.

(21) Appl. No.: 15/161,372

(22) Filed: May 23, 2016

(65) Prior Publication Data

US 2017/0334542 A1    Nov. 23, 2017

(51) Int. Cl.
*B64C 3/56*   (2006.01)
*F42B 10/14*  (2006.01)
*B64C 39/02*  (2006.01)
*F42B 15/10*  (2006.01)

(52) U.S. Cl.
CPC ............... *B64C 3/56* (2013.01); *B64C 39/02* (2013.01); *F42B 10/14* (2013.01); *B64C 2201/102* (2013.01); *F42B 15/105* (2013.01)

(58) Field of Classification Search
CPC ..... B64C 3/56; B64C 2201/102; F42B 15/00; F42B 10/14; F42B 15/105
See application file for complete search history.

(56) References Cited

U.S. PATENT DOCUMENTS

| | | | |
|---|---|---|---|
| 3,031,967 A | 2/1959 | Jasse | |
| 3,125,956 A | 3/1964 | Kongelbeck | |
| 3,650,496 A | 3/1972 | Svensson | |
| 3,666,210 A * | 5/1972 | Look | B64C 3/56 244/218 |
| 4,691,880 A | 9/1987 | Frank | |
| 4,717,093 A | 1/1988 | Rosenberger et al. | |
| 5,615,846 A * | 4/1997 | Shmoldas | F42B 15/105 244/3.26 |
| 6,986,481 B2 * | 1/2006 | Fanucci | B64C 3/40 244/3.26 |
| 7,185,847 B1 * | 3/2007 | Bouchard | F42B 10/12 244/3.28 |
| 8,809,755 B1 * | 8/2014 | Patel | F42B 19/06 244/3.26 |
| 2010/0282917 A1 * | 11/2010 | O'Shea | B64C 39/024 244/218 |
| 2016/0264232 A1 * | 9/2016 | Briancourt | B64C 3/56 |
| 2017/0137112 A1 * | 5/2017 | Winkelmann | B64C 3/56 |
| 2017/0174314 A1 * | 6/2017 | Diamante | B64C 3/56 |

* cited by examiner

*Primary Examiner* — Brian M O'Hara
*Assistant Examiner* — Keith L Dixon
(74) *Attorney, Agent, or Firm* — Ostrager Chong Flaherty & Broitman P.C.

(57) ABSTRACT

A airborne vehicle comprising a fuselage, a folding wing-like structure which is movable from a stowed position to a deployed position, and a hinge mechanism which couples the folding wing-like structure to the fuselage in a manner so that the folding wing-like structure displaces and rotates during movement from the stowed position to the deployed position. The hinge mechanism is housed within an outer mold line of the fuselage and folding wing-like structure to decrease the signature of the airborne vehicle.

19 Claims, 12 Drawing Sheets

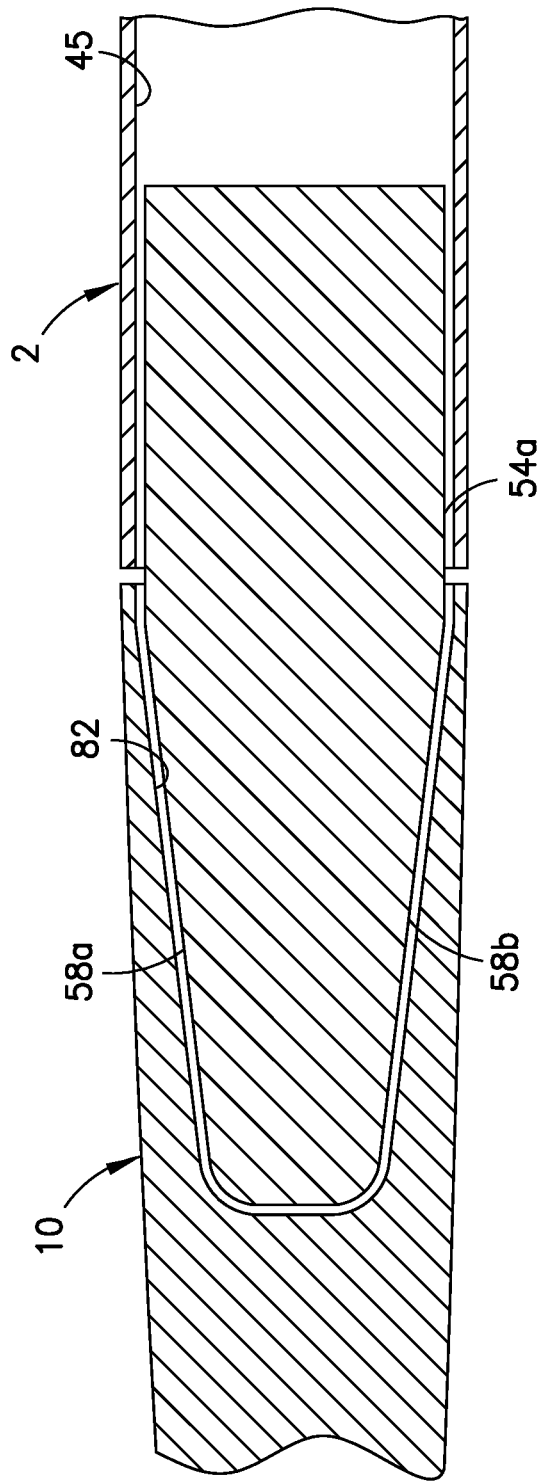

LOW-PROFILE WING HINGE MECHANISM

BACKGROUND

This disclosure generally relates to folding wing-like structures for airborne vehicles such as missiles, glide bombs and unmanned aerial vehicles.

Many missiles utilize wings or stabilizers (e.g., control fins) for stabilizing and guiding the missile during flight. Missiles are frequently stored and launched from tubular launchers, and may be deployed from aircraft, ships or land vehicles, where storage space is limited. Under such circumstances it is necessary to minimize the space required for storage of the missile prior to launch, and fixed wings substantially increase the storage space requirements.

In view of the foregoing, various folding wing-like structures have been proposed for missiles, which structures are initially retracted into a storage position and can be deployed automatically during flight of the missile to swing out from the missile body. Some folding wing-like structures currently incorporated in missiles use hinges to pivotably couple the folding wing to the missile body. However, the known wing hinge mechanisms are large and exceed the outer mold line (OML) of the wing/fuselage of the missile, creating "blisters" or other visible external features. These features increase the signature of the missile, decreasing its effectiveness.

It would be desirable to provide a low-profile internal wing deployment hinge mechanism for missiles that has a reduced signature as compared to folding wings deployed using external hinges.

SUMMARY

This disclosure is directed to a low-profile internal wing deployment hinge mechanism for airborne vehicles such as missiles, glide bombs and unmanned aerial vehicles. The hinge mechanism is housed within the OML of the wing/fuselage of the small airborne vehicle (e.g., a missile), thereby greatly reducing its signature and improving the effectiveness of the overall system. Similar hinge mechanisms can also be used to enable control fin deployment.

As used herein, the term "fin" means a small wing and the term "control fin" means a fin that is rotatable about an axis to change its angle of attack during flight. In addition, the term "wing-like structures" should be understood to refer to a category of aerodynamic flight surfaces that includes wings and fins as members.

One aspect of the subject matter disclosed in detail below is an airborne vehicle comprising a fuselage, a folding wing-like structure which is movable from a stowed position to a deployed position, and a hinge mechanism which couples the folding wing-like structure to the fuselage in a manner so that the folding wing-like structure displaces and rotates during movement from the stowed position to the deployed position, wherein the hinge mechanism is housed within the outer mold lines of the fuselage and folding wing-like structure.

In accordance with some embodiments, the hinge mechanism comprises: a first fixed linkage pin attached to the fuselage; a second fixed linkage pin attached to the folding wing-like structure; a link coupling pin; a first angled link having one end rotatably coupled to the first fixed linkage pin and an intermediate portion coupled to the link coupling pin; and a second angled link having one end rotatably coupled to the second fixed linkage pin and an intermediate portion coupled to the link coupling pin, at least one of the first and second angled links being rotatably coupled to the link coupling pin to allow relative rotation of the first and second angled links.

In accordance with one embodiment, the airborne vehicle as described in the two preceding paragraphs further comprises a first linear guide surface formed in the fuselage and a second linear guide surface formed in the folding wing-like structure. In addition, the hinge mechanism further comprises: a first link slider pin coupled to another end of the second angled link and a second link slider pin coupled to another end of the first angled link. The first link slider pin is displaceable parallel to the first linear guide surface and the second link slider pin is displaceable parallel to the second linear guide surface. The airborne vehicle may further comprise a linear actuator configured to cause the other end of the second angled link to displace relative to the fuselage when the linear actuator is actuated. The linear actuator is housed within the fuselage. In some implementations, the first and second linear guide surfaces are slots.

In accordance with one embodiment, the fuselage comprises a first cavity, and the airborne vehicle further comprises a locking block which is movable from a first position in the first cavity when the folding wing-like structure is in the stowed position to a second position partly in and partly projecting out of the first cavity when the folding wing-like structure is in the deployed position; and a spring arranged to urge the locking block toward the second position. In addition, the folding wing-like structure comprises a second cavity, and a portion of the locking block projects into the second cavity when the folding wing-like structure is in the deployed position. Preferably the second cavity has tapered surfaces and the portion of the locking block that projects into the second cavity has tapered surfaces.

Another aspect of the subject matter disclosed in detail below is an airborne vehicle comprising: a fuselage; a folding wing-like structure which is movable from a stowed position to a deployed position; a hinge mechanism which couples the folding wing-like structure to the fuselage in a manner so that the folding wing-like structure displaces and rotates during movement from the stowed position to the deployed position, wherein the hinge mechanism comprises: a first fixed linkage pin having opposed ends attached to the fuselage; a second fixed linkage pin having opposed ends attached to the folding wing-like structure; a link coupling pin; first and second angled links each having one end rotatably coupled to the first fixed linkage pin and an intermediate portion coupled to the link coupling pin; and third and fourth angled links each having one end rotatably coupled to the second fixed linkage pin and an intermediate portion coupled to the link coupling pin, wherein at least some of the first through fourth angled links are rotatably coupled to the link coupling pin to allow concurrent rotation of the first and second angled links relative to third and fourth angled links. This airborne vehicle further comprises first and second linear guide surfaces formed in the fuselage and third and fourth linear guide surfaces formed in the folding wing-like structure, wherein the hinge mechanism further comprises: a first link slider pin coupled to another end of each of the third and fourth angled links and a second link slider pin coupled to another end of each of the first and second angled links, wherein opposing ends of the first link slider pin are displaceable parallel to the first and second linear guide surfaces respectively, while opposing ends of the second link slider pin are displaceable parallel to the third and fourth linear guide surfaces respectively. In addition, the airborne vehicle may comprise a locking block that is movable from fully inside the fuselage to a position partly projecting into a cavity formed in the wing-like structure for the purpose of locking the wing-like structure in its deployed position.

A further aspect of the subject matter disclosed in detail below is an airborne vehicle comprising: a fuselage having a longitudinal axis; a first cylinder housed inside and rotatably coupled to the fuselage; a folding control fin which is movable from a stowed position to a deployed position and which is also rotatable about a lateral axis perpendicular to the longitudinal axis; a second cylinder housed inside and fixedly coupled to the folding control fin; and a hinge mechanism which couples the first and second cylinders in a manner such that the second cylinder is displaceable and rotatable relative to the first cylinder, wherein the hinge mechanism comprises: a first fixed linkage pin having opposed ends attached to the first cylinder; a second fixed linkage pin having opposed ends attached to the second cylinder; a link coupling pin; a first angled link having one end rotatably coupled to the first fixed linkage pin and an intermediate portion coupled to the link coupling pin; and a second angled link having one end rotatably coupled to the second fixed linkage pin and an intermediate portion coupled to the link coupling pin, wherein at least one of the first and second angled links is rotatably coupled to the link coupling pin to allow rotation of the first angled link relative to second angled link.

In accordance with one embodiment, the airborne vehicle described in the preceding paragraph further comprises a first linear guide surface formed in the first cylinder and a second linear guide surface formed in the second cylinder, wherein the hinge mechanism further comprises: a first link slider pin coupled to another end of the second angled link and a second link slider pin coupled to another end of the first angled link, and further wherein the first link slider pin is displaceable parallel to the first linear guide surface and the second link slider pin is displaceable parallel to the second linear guide surface. In accordance with some embodiments, the airborne vehicle further comprises a linear actuator configured to cause the other end of the second angled link to displace relative to the first cylinder when the linear actuator is actuated. This linear actuator is housed within the fuselage.

Other aspects of low-profile internal wing deployment hinge mechanisms for airborne vehicles are disclosed below.

BRIEF DESCRIPTION OF THE DRAWINGS

FIG. 3A shows the state of the hinge mechanism when the folding wing is fully deployed, while FIG. 3F shows the state of the hinge mechanism when the folding wing is stowed (i.e., folded). FIGS. 3B through 3E show intermediate states of the hinge mechanism (i.e., the folding wing is neither folded nor fully deployed).

FIG. 8 is a diagram representing a sectional view taken along a section line 8-8 indicated in FIG. 7.

Reference will hereinafter be made to the drawings in which similar elements in different drawings bear the same reference numerals.

DETAILED DESCRIPTION

Illustrative embodiments of folding wing systems are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Although a Harpoon missile will be specifically mentioned in the following disclosure of various embodiments of folding wing systems, it should be appreciated that the disclosed embodiments are not limited in their application to Harpoon missiles, but rather can be employed on glide bombs, unmanned aerial vehicles and other types of missiles. (For the purpose of this disclosure, the term "airborne vehicle" should be construed broadly to also include missiles, glide bombs and unmanned aerial vehicles.)

Figure 1:
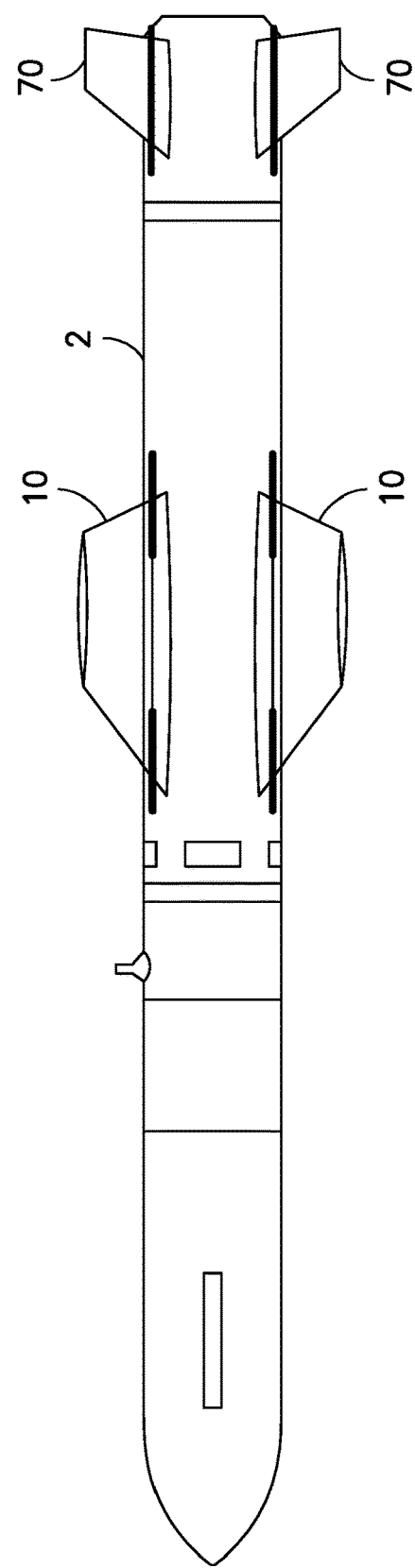
FIG. 1 is a diagram representing a side view of a Harpoon missile having folding wings and folding control fins.

FIG. 1 is a diagram representing a side view of a Harpoon missile comprising a fuselage 2, a plurality (i.e., four) of folding wings 10, and a plurality (i.e., four) of control fins 70. A hinge mechanism suitable for use with each folding wing 10 and each folding control fin 70 will be described below with reference to FIGS. 2A, 2B, and 3A-3F. A missile comprising a fuselage 2, a folding wing 10 and a hinge mechanism configured to couple the folding wing 10 to the fuselage 2 will be described in further detail with reference to FIGS. 4-8. A missile comprising a fuselage 2, a folding control fin 70 and a hinge mechanism configured to couple the folding control fin 70 to the fuselage 2 will be described in further detail with reference to FIGS. 9 and 10.

Figure 2A:
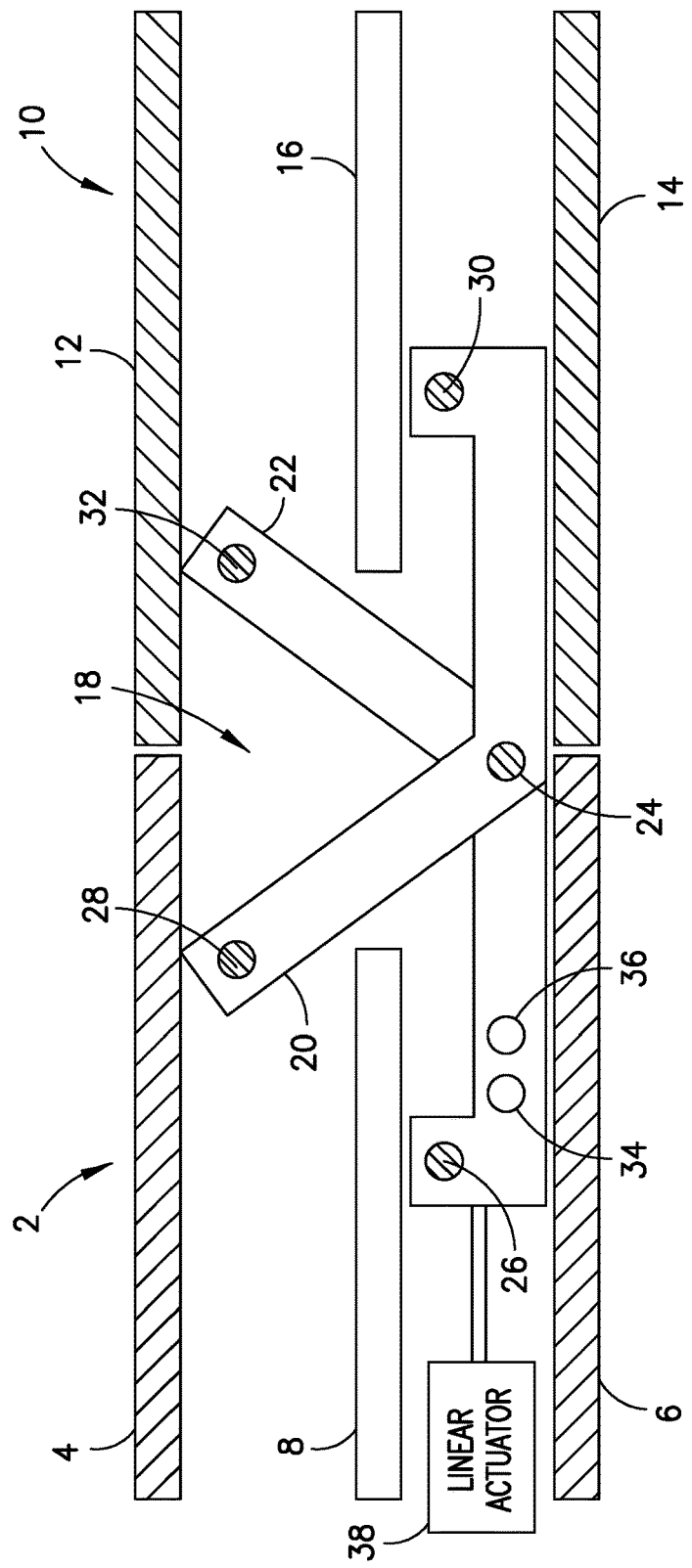
FIG. 2A is a diagram representing a sectional view of portions of the fuselage and folding wing of a missile which house respective portions of a hinge mechanism in accordance with one embodiment.

FIG. 2A is a diagram representing a sectional view of portions of a fuselage 2 and a folding wing 10 of a missile in accordance with one embodiment. A hinge mechanism 18 couples the folding wing 10 to the fuselage 2 in a manner such that the folding wing 10 will displace and rotate during movement from a stowed (i.e., folded) position to a fully deployed (i.e., not folded) position. The folding wing 10 is shown in a fully deployed state in FIG. 2A.

As seen in FIG. 2A, the fuselage 2 comprises an internal upper wall 4 and an internal lower wall 6, which define an interior space of the fuselage 2. An outer mold line of the fuselage 2 is not shown in FIG. 2A. The outer mold line of the folding wing 10 is defined in part by an external upper wall 12 and an external lower wall 14, which further define an interior space of the folding wing. One portion of the hinge mechanism 18 is disposed within the fuselage interior space, while another portion of the hinge mechanism 18 is disposed within the folding wing interior space. Because the hinge mechanism 18 resides in interior spaces, it does not extend beyond the outer mold line of the fuselage 2 or the outer mold line of the folding wing 10.

Still referring to FIG. 2A, the hinge mechanism 18 in accordance with one embodiment comprises: a first fixed linkage pin 28 having opposing ends attached to respective portions of the fuselage 2 (not shown); a second fixed linkage pin 32 having opposing ends attached to respective portions of the folding wing 10 (not shown); a link coupling pin 24; a first angled link 20 having one end rotatably coupled to the first fixed linkage pin 28 and an intermediate portion coupled to the link coupling pin 24; and a second angled link 22 having one end rotatably coupled to the second fixed linkage pin 32 and an intermediate portion coupled to the link coupling pin 24, at least one of the intermediate portions of the first and second angled links 20 and 22 being rotatably coupled to the link coupling pin 24 to allow relative rotation of the first and second angled links 20 and 22.

Still referring to FIG. 2A, the first fixed linkage pin 28 and a bearing (not shown) of the first angled link 20 form a first revolute joint; the second fixed linkage pin 32 and a bearing (not shown) of the second angled link 22 form a second revolute joint; and the link coupling pin 24 and a bearing of either one or both of the first and second angled links 20 and 22 form a third revolute joint. In accordance with an alternative embodiment, one or both of the first and second angled links 20 and 22 could be rotatably coupled to the link coupling pin 24 without using a bearing since the missile is used one time and the risk of binding is small for single-use items. The link coupling pin 24 may be configured to shear in the event that the first and second angled links 20 and 22 become jammed during deployment, thereby unjamming the hinge mechanism 18.

In addition, the hinge mechanism 18 further comprises: a first link slider pin 26 coupled to another end of the second angled link 22; a second link slider pin 30 coupled to another end of the first angled link 20; an up lock pin 34 translatably coupled to the second angled link 22; and a down lock pin 36 translatably coupled to the second angled link 22.

The up lock pin 34, when inserted in a respective hole in the fuselage, locks the folding wing 10 in its stowed position. Up lock pins may be provided on both sides of the hinge mechanism 18. The up lock pins can be withdrawn simultaneously from their respective holes by a linear actuator (not shown), thereby releasing the folding wing 10 for deployment. Preferably, the up lock pins are electrically actuated so that they can unlock at the correct time. They could also be connected to the linear actuator 38 if one were to use a single motor to drive both the up lock pins and the second angled link 22 using a linkage or gear system.

The down lock pin 36, when inserted in a respective hole in the fuselage, locks the folding wing 10 in its fully deployed position. Down lock pins may be provided on both sides of the hinge mechanism 18. The down lock pins can be inserted simultaneously into their respective holes by a linear actuator (not shown), thereby locking the folding wing 10 in a fully deployed position. Preferably, each down lock pin is spring loaded or actuated using a respective pyrotechnic actuator so that it will be urged into its respective hole when the folding wing 10 reaches it fully deployed position.

It should be appreciated that other types of locking mechanisms can be employed. For example, the linear actuator could be designed to perform a locking function.

If analysis reveals that the down lock pins might be incapable of bearing the wing bending loads, then the down lock pins could be eliminated. Instead locking blocks of the type described below could be used to transfer the wing bending loads to the fuselage. In an alternative embodiment having locking blocks, the down lock pins could also be included for the purpose of removing load from the linear actuator for the linkage system.

Although only two angled links are shown in FIG. 2A, more than two angled links can be combined in one hinge assembly. For embodiments that employ hinge assemblies comprising multiple first angled links, each first angled link 20 has one end rotatably coupled to the first fixed linkage pin 28 and an intermediate portion coupled to the link coupling pin 24. Similarly, for embodiments that employ hinge assemblies comprising multiple second angled links, each second angled link 22 has one end rotatably coupled to the second fixed linkage pin 32 and an intermediate portion coupled to the link coupling pin 24. The intermediate portions of either the first angled links or the second angled links (or both) are rotatably coupled to the link coupling pin 24 to allow relative rotation of the first and second angled links 20 and 22.

In addition, it should be appreciated that opposing ends of the first fixed linkage pin 28 are attached to the fuselage 2, while opposing ends of the second fixed linkage pin 32 are attached to the folding wing 10. In contrast, opposing ends of the link coupling pin 24 can have a length shorter than the lengths of first and second fixed linkage pins 28 and 32 because the function of the link coupling pin 24 is to rotatably couple the angled links to each, not couple the hinge mechanism 17 to either the fuselage 2 or the folding wing 10.

The fuselage 2 further comprises a first pair of linear guide plates which are disposed on the opposite sides of the hinge mechanism 18. FIG. 2A shows one such linear guide plate 8 (disposed parallel with internal top wall 4 and internal bottom wall 6 of the fuselage 2) when viewed from the side; the other linear guide plate of the first pair is not shown in FIG. 2A. The bottom surfaces of the first pair of linear guide plates block upward vertical movement of the opposing ends of the first slider pin 26 attached to the other end of the second angled link 22. Similarly, the folding wing 10 further comprises a second pair of linear guide plates which are likewise disposed on opposite sides of the hinge mechanism 18. FIG. 2A shows one such linear guide plate 16 (disposed parallel with external top wall 12 and external bottom wall 14 of the folding wing 10) when viewed from the side; the other linear guide plate of the second pair is not shown in FIG. 2A (but see linear guide plates 16a and 16b shown in FIG. 4). The bottom surfaces of the second pair of linear guide plates block upward vertical movement of the opposing ends of a second slider pin 30 attached to the other end of the first angled link 20.

To clarify the structure depicted in FIG. 2A, it should be understood that respective projecting portions of the first and second link slider pins 26 and 30 extend into the page and beyond the plane in which the second angled link 22 rotates. Likewise the linear guide plates 8 and 16 are situated behind the plane in which the second angled link 22 rotates, but respectively overlying the projecting portions of the first and second link slider pins 26 and 30.

Figure 4:
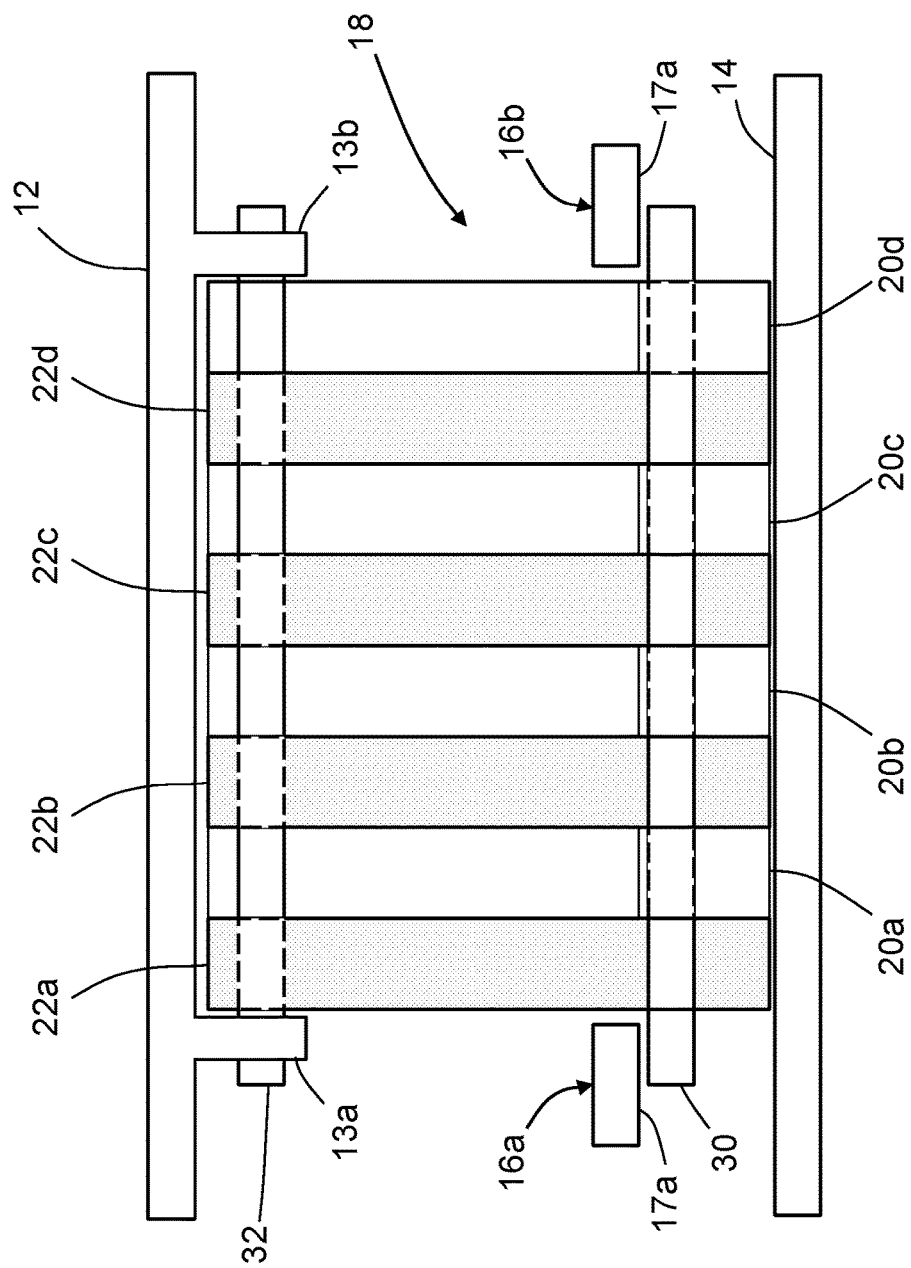
FIG. 4 is a diagram representing an end view of the hinge mechanism depicted in FIG. 2A.

FIG. 4 shows an end view of a hinge mechanism 18 having four first angled links 20a-20d and four second angled links 22a-22d (the latter being interleaved with the former) when viewed from the folding wing side. To avoid clutter in the drawing, only second slider pin 30 and second linkage pin 32 are shown in FIG. 4. Each of the first angled links 20a-20d is coupled to the second slider pin 30, as indicated by dashed lines in FIG. 4. In the view as seen in FIG. 4, the upper portions of each of the first angled links 20a-20d are behind and not coupled to the second fixed linkage pin 32. In addition, each of the second angled links 22a-22d is rotatably coupled to the second fixed linkage pin 32, as indicated by dashed lines in FIG. 4. In the view as seen in FIG. 4, the lower portions of each of the second angled links 22a-22d are behind and not coupled to the second slider pin 30.

Still referring to FIG. 4, the folding wing 10 further comprises a pair of linear guide plates 16a and 16b which respectively overlie the opposing ends of the second slider pin 30. The bottom surface of linear guide plate 16a serves as a linear guide surface 17a, while the bottom surface of linear guide plate 16b serves as a linear guide surface 17b. When the second slider pin 30 is displaced upward, one end of second slider pin 30 will contact linear guide surface 17a and the other end of second slider pin 30 will contact linear guide surface 17b. The linear guide surfaces 17a and 17b can be positioned at a height above the external bottom wall 14 of folding wing 10 such that they guide the opposing ends of the second slider pin 30 to move linearly and parallel to the external bottom wall 14 of the folding wing 10. Similarly, the pair of linear guide plates attached to the fuselage 2 (i.e., linear guide plate 8 shown and a similar linear guide plate not shown in FIG. 2A) guide the opposing ends of the first slider pin 26 to move linearly and parallel to the internal bottom wall 6 of the fuselage 2.

Referring again to FIG. 2A, the missile further comprises a linear actuator 38 which is coupled to one end of the second angled link 22. The linear actuator 38 is housed inside the fuselage 2. FIG. 2A shows the folding wing 10 fully deployed. The linear actuator 38 is shown in its retracted state following activation. Retraction of the linear actuator 38 causes the coupled end of the second angled bracket 22 to move from right to left, which in turn causes the folding wing 10 to rotate and displace from a folded position to the fully deployed position seen in FIG. 2A. During retraction of the linear actuator 38, the first slider pin 26 moves parallel to linear guide plate 8, while the second slider pin 30 moves parallel to linear guide plate 16.

Figure 2B:
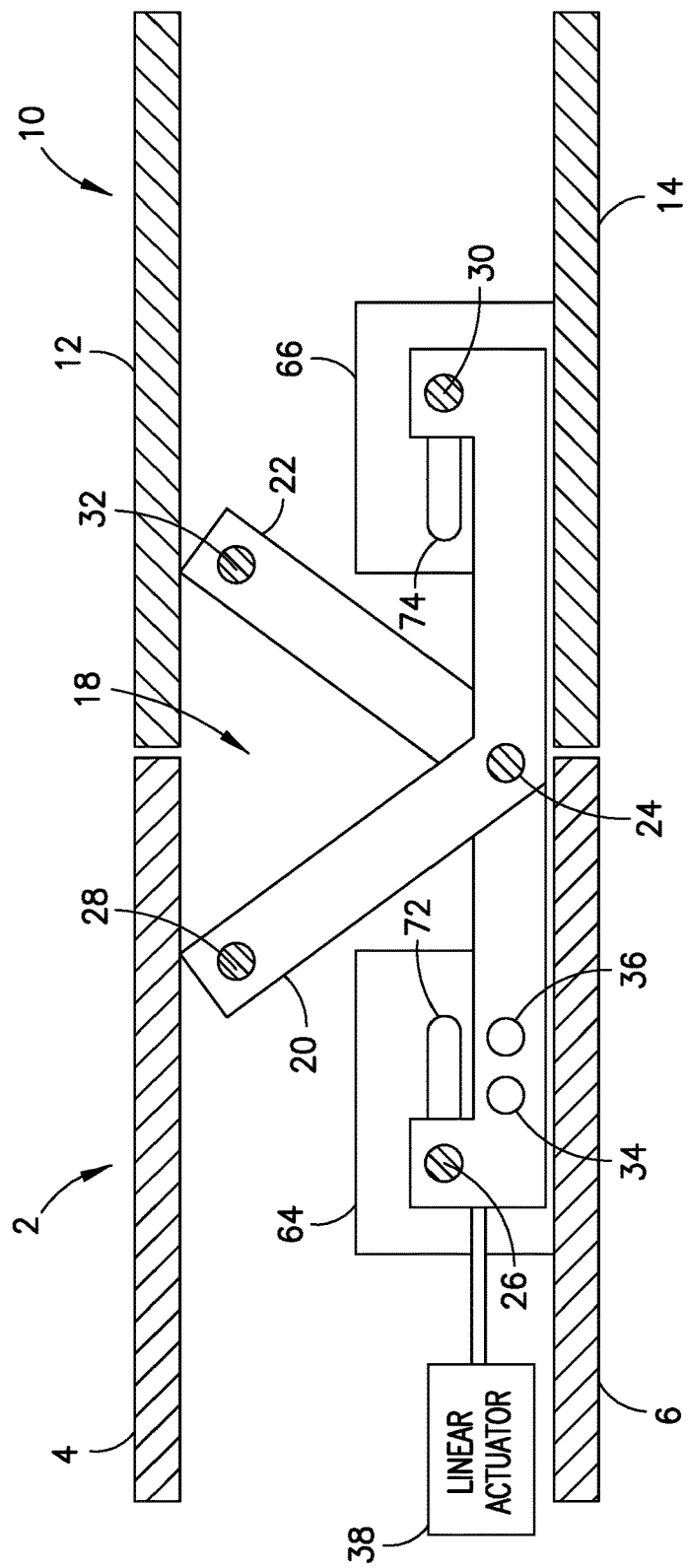
FIG. 2B is a diagram representing a sectional view of portions of the fuselage and folding wing of a missile which house respective portions of a hinge mechanism in accordance with another embodiment.

FIG. 2B is a diagram showing a fuselage 2, a folding wing 10 and a hinge mechanism 18 in accordance with an alternative embodiment. The embodiment depicted in FIG. 2B differs from the embodiment depicted in FIG. 2A in the following respects. First, the linear guide plate 8 seen in FIG. 2A is replaced by a slotted vertical wall 64 having a slot 72 (see FIG. 2B) which serves as a linear guide surface that guides linear movement of the first slider pin 26 parallel with the internal bottom wall 6 of the fuselage 2. Second, the linear guide plate 16 seen in FIG. 2A is replaced by a slotted vertical wall 66 (see FIG. 2B) having a slot 74 which serves as a linear guide surface that guides linear movement of the second slider pin 30 parallel with the external bottom wall 14 of the folding wing 10. Since both ends of the slider pins need to be guided, the embodiment partly depicted in FIG. 2B incorporates linear guide surfaces in the form of slots 72 and 74 on both sides of the hinge mechanism 18. More specifically, the opposing ends of the first slider pin 26 slide in respective slots formed in a first pair of slotted vertical walls (only one of which, i.e., slotted vertical wall 64 having a slot 72, is shown in FIG. 2B) disposed on opposite sides of the hinge mechanism 18. Similarly, the opposing ends of the second slider pin 30 slide in respective slots formed in a second pair of slotted vertical walls (only one of which, i.e., slotted vertical wall 66 having a slot 74, is shown in FIG. 2B) disposed on opposite sides of the hinge mechanism 18.

In both of the embodiments depicted in FIGS. 2A and 2B, in response to activation of the linear actuator 38, the first slider pin 26 will be displaced. This in turn causes the second angled link 22 to displace. As the second angled link 22 displaces, link coupling pin 24 and the intermediate portion of first angled link 20 (which is coupled to link coupling pin 24) also start to move. However, the movements of link coupling pin 24 and the intermediate portion of first angled link 20 are constrained by the coupling of the other end of first angled link 20 to the first fixed linkage pin 28 on the fuselage 2. As a result, link coupling pin 24 is constrained to travel along a circular arc centered at the axis of the first fixed linkage pin 28, thereby causing the first angled link 20 to rotate about the first fixed linkage pin 28 as the first slider pin 26 continues to be displaced by the linear actuator 38. At the same time, the second angled link 22 rotates and displaces. Since the end of the second angled link 22 is rotatably coupled to the second fixed linkage pin 32 and since the second fixed linkage pin 32 is attached to the folding wing 10, the folding wing 10 also rotates and displaces relative to the fuselage 2 as the second angled link 22 rotates and displaces.

Figure 3A:
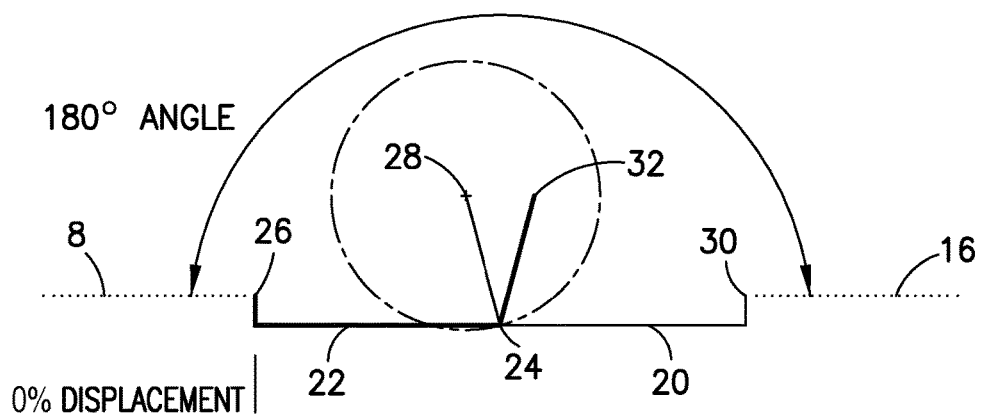
FIGS. 3A through 3F are diagrams representing the kinematics of a wing hinge mechanism of the type depicted in FIGS. 2A and 2B.
Figure 3B:
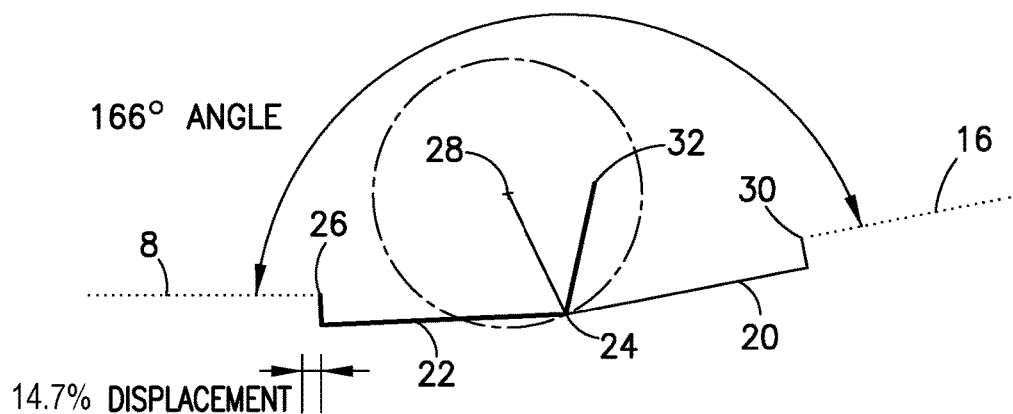
Figure 3C:
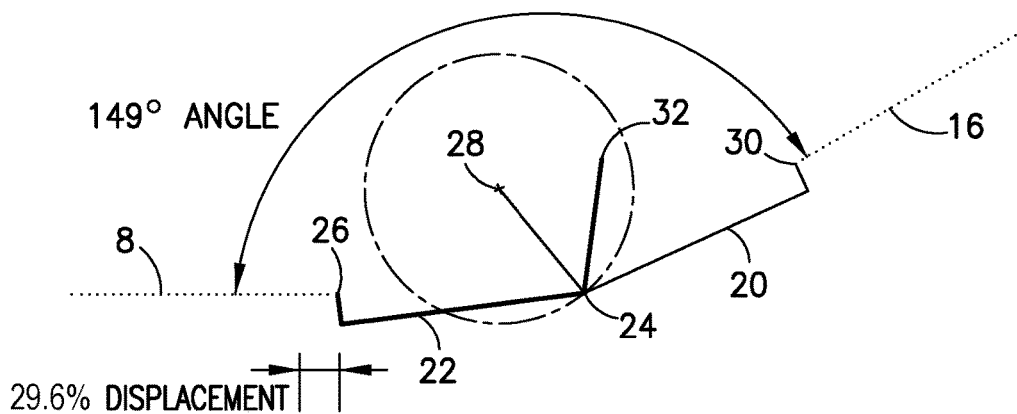
Figure 3D:
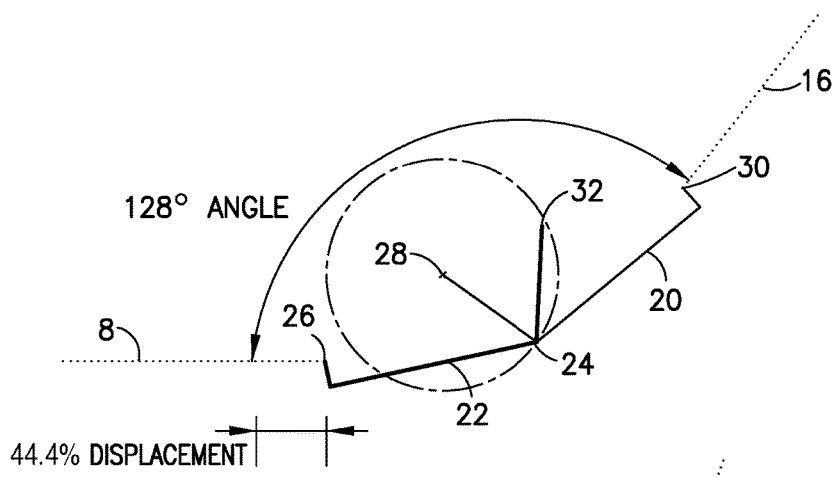
Figure 3E:
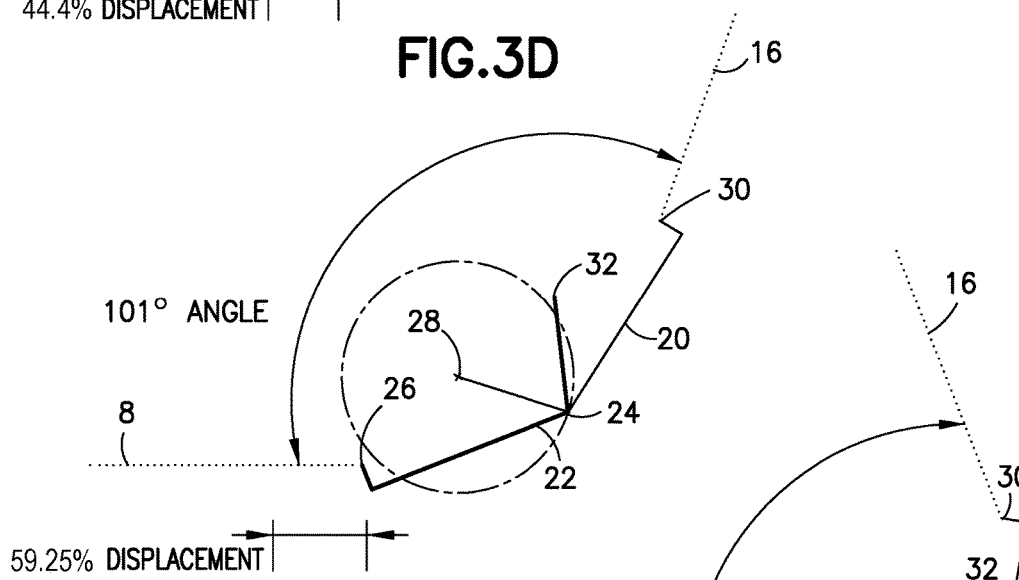
Figure 3F:
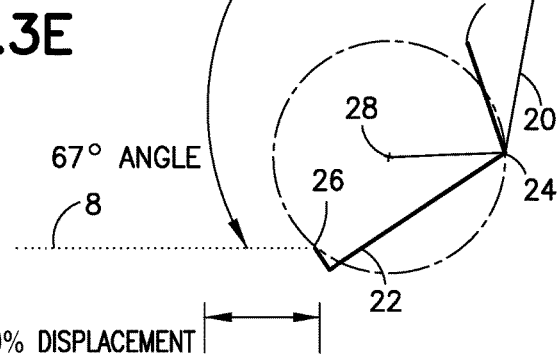

FIGS. 3A through 3F are diagrams representing the kinematics of the wing hinge mechanism described in the preceding paragraph. FIG. 3A shows the state of the hinge mechanism when the folding wing is fully deployed, while FIG. 3F shows the state of the hinge mechanism when the folding wing is stowed (i.e., folded). FIGS. 3B through 3E show intermediate states of the hinge mechanism (i.e., the folding wing is neither folded nor fully deployed). By viewing FIGS. 3A-3F in sequence from FIG. 3A to FIG. 3F, the kinematics during stowing can be understood. Conversely, by viewing FIGS. 3A-3F in reverse sequence from FIG. 3F to FIG. 3A, the kinematics during deployment can be understood.

For the purpose of providing one example, the kinematics of the hinge mechanism were simulated for a case in which the wing root thickness and the link lengths (i.e., the distances separating the various pins) were assumed to have specified values. FIGS. 3A-3F show the various deployment angles between the linear guide plate 16 of the folding wing and the linear guide plate 8 of the fuselage as a function of the ratio (given as a percentage) of the magnitude of the linear displacement of the first slider pin 26 to the wing root thickness. It should be appreciated that if the links are sized differently (i.e., the distances between the pins is relatively smaller or larger), then the deployment angles will be different than those shown in FIGS. 3A-3F for the same percentage displacements. Also it should be understood that the simulated relationship between deployment angle and percentage displacement is a continuous function and only selected points along that curve are depicted in FIGS. 3A-3F.

In the state depicted in FIG. 3A, the displacement of the first slider pin 26 is 0% and the angle between the linear guide plate 16 of the folding wing and the linear guide plate 8 of the fuselage is 180°, i.e., the folding wing is in its fully deployed position. In the state depicted in FIG. 3B, the displacement of the first slider pin 26 is 14.75% and the angle between the linear guide plate 16 of the folding wing and the linear guide plate 8 of the fuselage is 166°. In the state depicted in FIG. 3C, the displacement of the first slider pin 26 is 29.6% and the angle between the linear guide plate 16 of the folding wing and the linear guide plate 8 of the fuselage is 149°. In the state depicted in FIG. 3D, the displacement of the first slider pin 26 is 44.4% and the angle between the linear guide plate 16 of the folding wing and the linear guide plate 8 of the fuselage is 128°. In the state depicted in FIG. 3E, the displacement of the first slider pin 26 is 59.25% and the angle between the linear guide plate 16 of the folding wing and the linear guide plate 8 of the fuselage is 101°. In the state depicted in FIG. 3F (i.e., the folding wing is stowed), the displacement of the first slider pin 26 is 74.0% and the angle between the linear guide plate 16 of the folding wing and the linear guide plate 8 of the fuselage is 67°. Thus the difference between the angle of orientation of the folding wing in the stowed position and the angle of orientation of the folding wing in the fully deployed position is approximately 113° for this particular computer simulation.

In the frame of reference of the missile fuselage, it can be seen in FIGS. 3A-3F that as the first angled link 20 rotates about the fixed linkage pin 28, the second angled link 22 and the linear guide plate 16 (which is affixed to the folding wing) each rotate and displace relative to linear guide plate 8 (which is affixed to the fuselage). Thus the folding wing 10 rotates and displaces relative to the fuselage 2 as it moves between its stowed and fully deployed positions.

Figure 5:
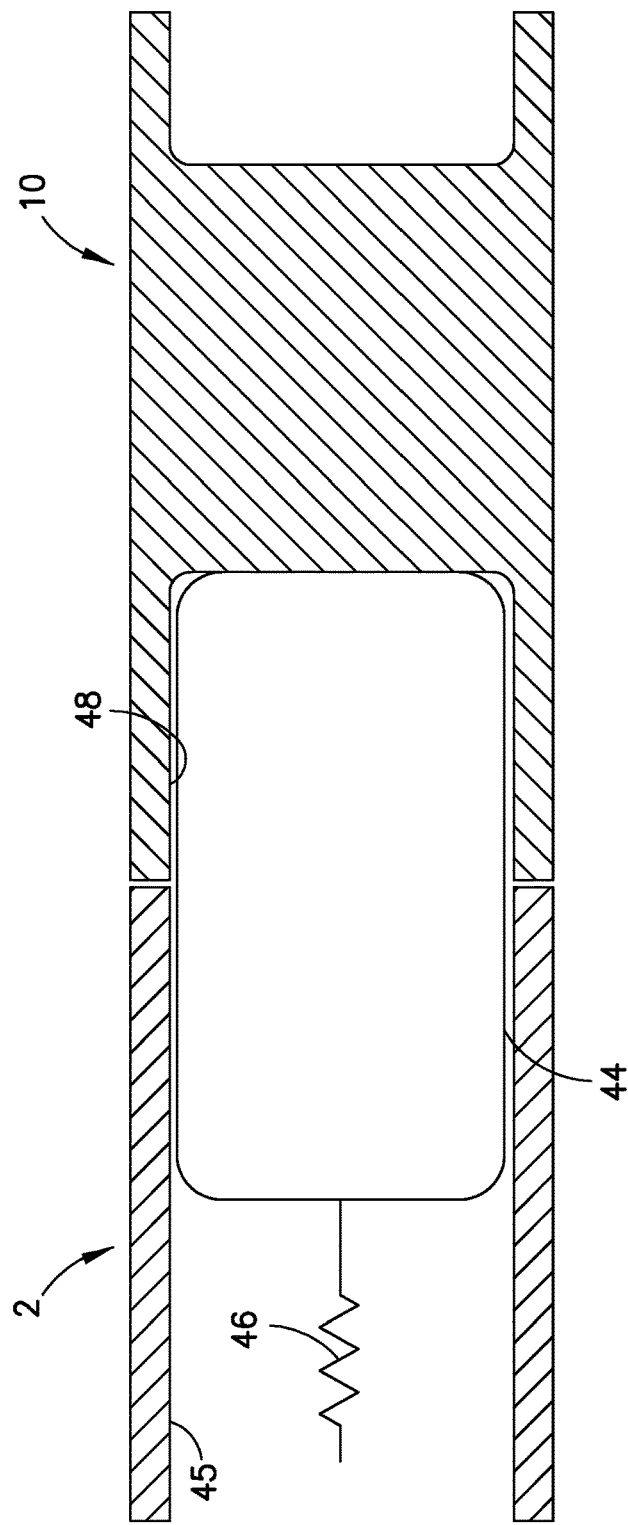
FIG. 5 is a diagram representing a sectional view of portions of the fuselage and wing which house a spring-loaded locking block that can be extended to lock the wing in its fully deployed position in accordance with one embodiment.

In cases where down lock pins of the type depicted in FIGS. 2A and 2B (i.e., down lock pin 36 attached to the second angled link 22) would provide insufficient wing bending load-bearing capacity, actuatable load-bearing locking blocks of the type depicted in FIG. 5 may be provided. FIG. 5 is a diagram representing a sectional view of portions of the fuselage 2 and folding wing 10 which house a spring-loaded locking block 44 that can be extended to lock the folding wing 10 in its fully deployed position in accordance with one embodiment. When the folding wing 10 is in its stowed position (not shown in FIG. 5), the locking block 44 would be disposed entirely within a first cavity 45 formed in the fuselage 2. When the folding wing 10 is moved to its fully deployed position, as shown in FIG. 5, then a second cavity 48 formed in the folding wing 10 will align with the first cavity 45. When the first and second cavities are aligned, the spring 46 will urge the locking block 44 forward until it reaches its final locking position seen in FIG. 5. In the final locking position, a rearward portion of the locking block 44 is disposed in the first cavity 45 while a forward portion of the locking block 44 projects snugly into the second cavity 48. In this position, the locking block 44 is able to transfer wing bending load to the fuselage 2. Multiple locking blocks can be provided as needed to transfer respective wing bending loads.

Figure 6:
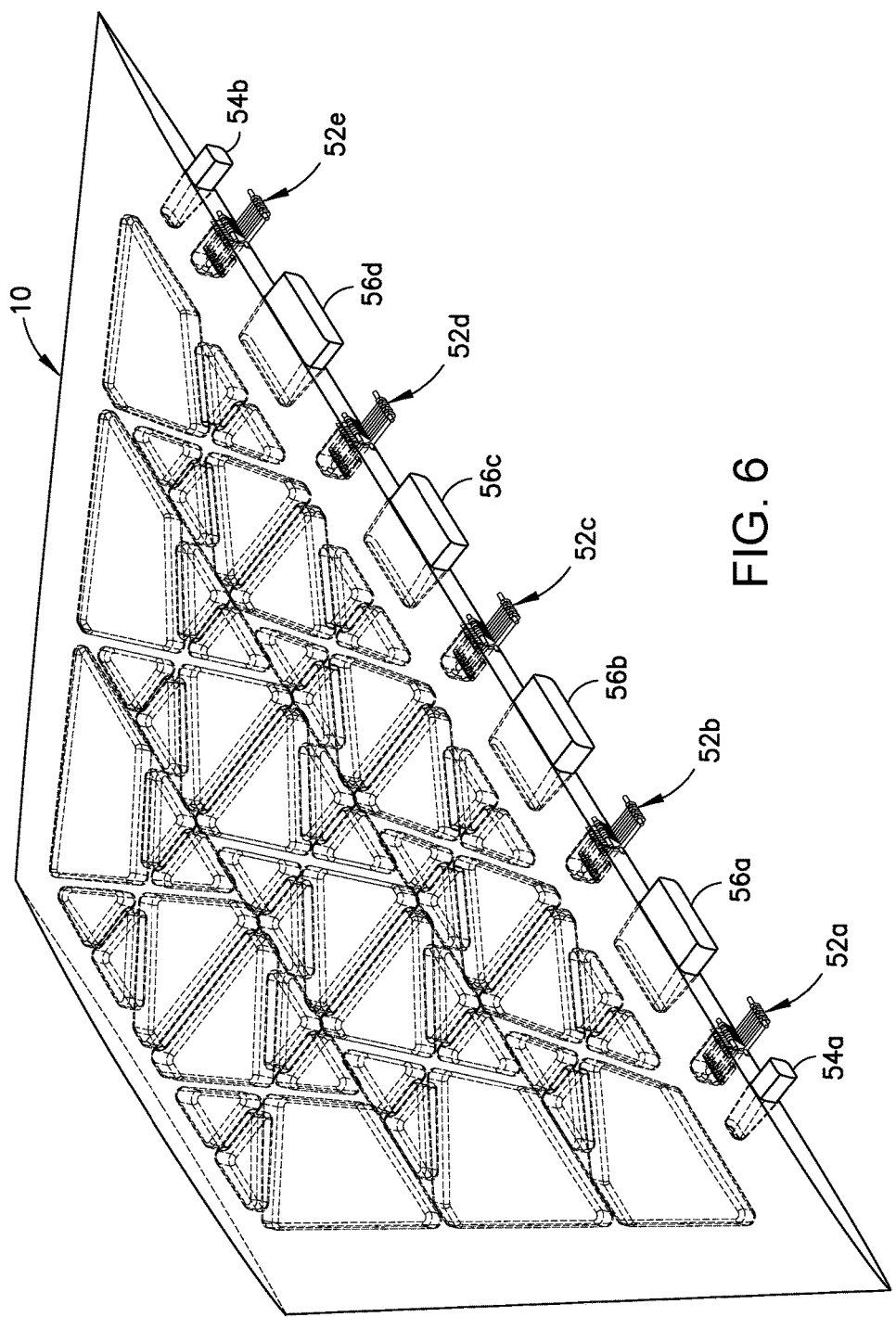
FIG. 6 is a diagram representing an isometric view of a folding wing system comprising a trapezoidal folding wing, hinge assemblies which couple the folding wing to a missile fuselage, and locking blocks which lock the folding wing in its fully deployed position in accordance with one embodiment. The dashed lines represent hidden structural features inside the folding wing.

FIG. 6 is a diagram representing an isometric view of a folding wing system comprising a trapezoidal folding wing 10, first through fifth hinge assemblies 52a-52e which couple the folding wing 10 to a missile fuselage (not shown in FIG. 6), and a multiplicity of locking blocks which lock the folding wing 10 in its fully deployed position in accordance with one embodiment. The dashed lines represent hidden structural features inside the folding wing 10. For this specific application, the multiplicity of locking blocks includes first and second narrow locking blocks 54a and 54b, and first through fourth wide locking blocks 56a-56d. More or fewer locking blocks can be used as appropriate.

Figure 7:
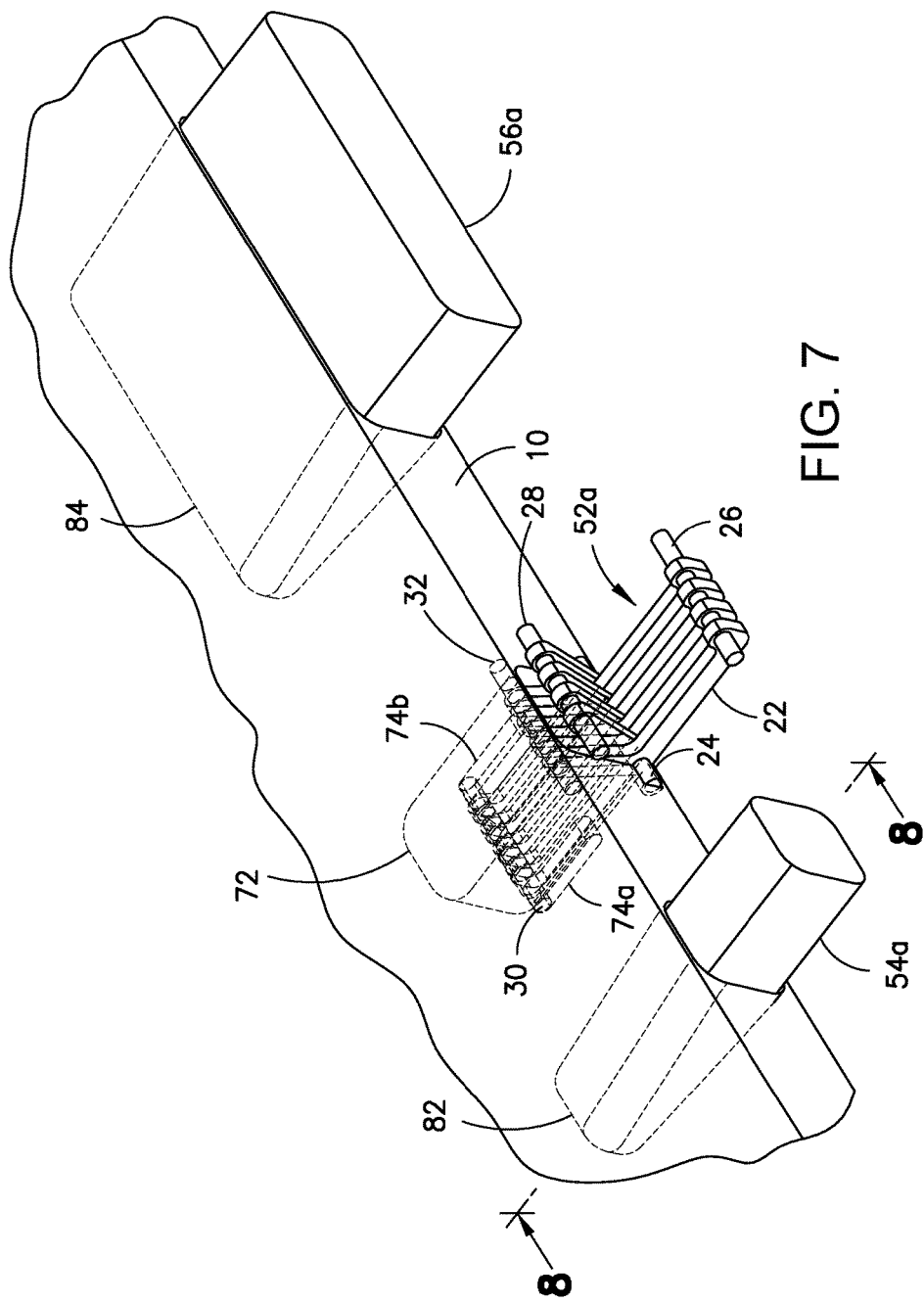
FIG. 7 is a diagram showing a portion of FIG. 6 on a magnified scale.

In FIG. 6, the locking blocks are shown in their respective locking positions. The forward portions of narrow locking blocks 54a, 54b and of wide locking blocks 56a-56d are received in respective similarly shaped cavities (indicated by dashed lines in FIG. 6) formed in folding wing 10. FIG. 7 is a diagram showing a portion of FIG. 6 on a magnified scale. As indicated by dashed lines in FIG. 7, narrow locking block 54a slides into a similarly shaped cavity 82, while wide locking block 56a slides into a similarly shaped cavity 84.

For example, FIG. 8 is a diagram showing a narrow locking block 54a having a forward portion that projects into a similarly shaped cavity 82 formed in the folding wing 10. In this example, the forward portion of the locking block 54a has upper and lower tapered surfaces 58a and 58b. The cavity 82 has respective tapered surfaces which taper at the same angles as tapered surfaces 58a and 58b. Preferably, the tapered surfaces 58a and 58b will respectively contact the respective tapered surfaces inside cavity 82, thereby facilitating the transfer of wing bending loads to the fuselage via the locking block 54a. The other locking blocks and corresponding cavities formed in the folding wing 10 (as shown in FIG. 7) may be configured with similarly tapered surfaces.

The locking blocks can be spring loaded or extended using pyrotechnic actuation since deployment is typically a one-way single-use action. In the alternative, actuation using electric motors could be made to work if there were a reason for electric actuation.

Referring again to FIG. 7, portions of the hinge assembly 52a are disposed in a cavity 72 formed in the folding wing 10. The other hinge assemblies 52b-52e seen in FIG. 6 are likewise disposed in cavities having the same size and shape as cavity 72 seen in FIG. 7. In accordance with one embodiment, a pair of slots 74a and 74b, which communicate with cavity 72, are formed on opposing sides of the hinge assembly 52a. Slots 74a and 74b respectively receive the opposing ends of the second slider pin 30, as previously described. Because the wing bending loads are transferred to the fuselage (not shown in FIG. 7) by the locking blocks, the opposing ends of the second slider pin 30 are able to "float" in the slots 74a and 74b.

Figure 7A:
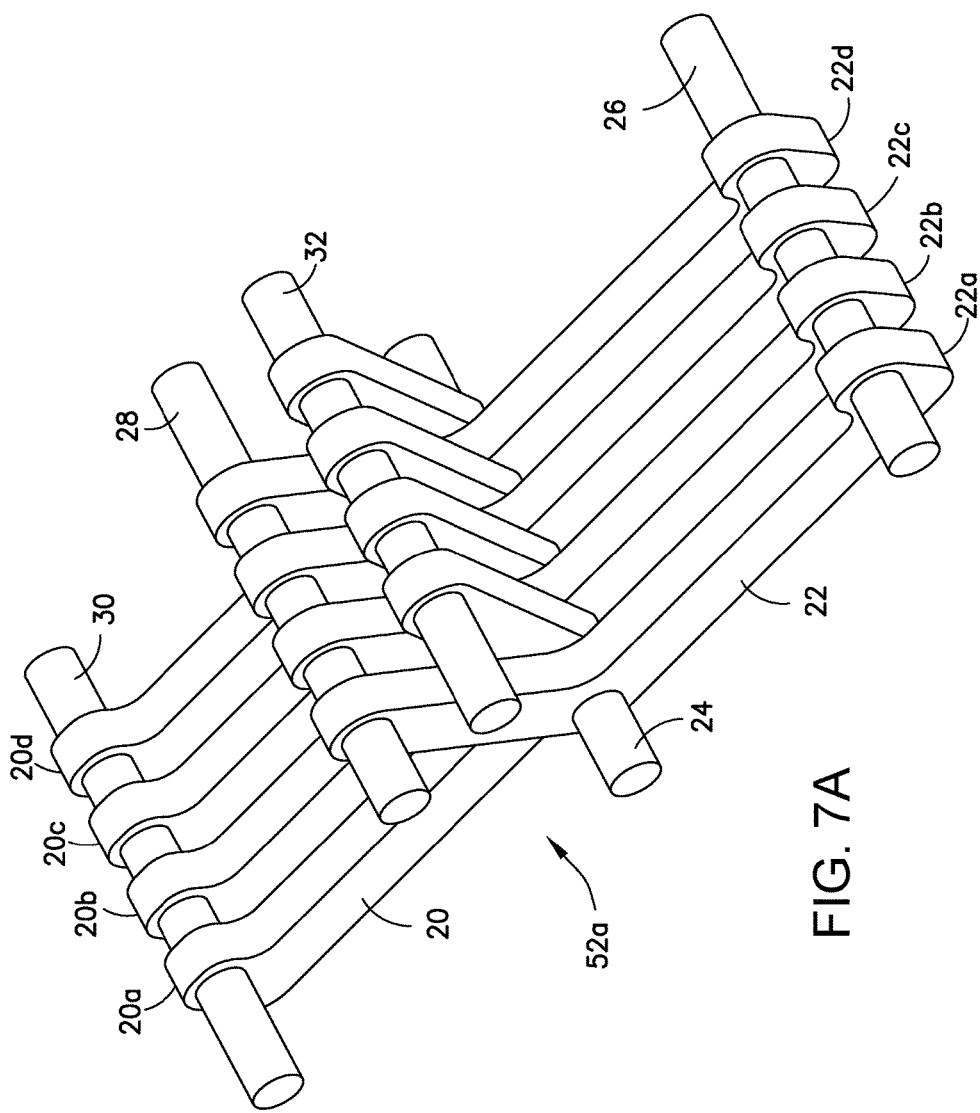
FIG. 7A is a diagram representing an isometric view of the hinge assembly depicted in FIG. 7.

FIG. 7A is a diagram representing an isometric view of the hinge assembly 52a depicted in FIG. 7, but on a magnified scale. In accordance with one embodiment, each of the five hinge assemblies 52a-52e has the structure depicted in FIG. 7A. That structure includes four first angled links 20a-20d and four second angled links 22a-22d, interleaved with each other. Each of the four first angled links 20a-20d has one end rotatably coupled to the first fixed linkage pin 32 (which is attached to the fuselage) and the other end coupled to the second slider pin 30. Each of the four second angled links 22a-22d has one end rotatably coupled to the second fixed linkage pin 28 (which is attached to the folding wing) and the other end coupled to the first slider pin 26. The interleaved intermediate portions of angled links 20a-20d and 22a-22d are rotatably coupled to the link coupling pin 24.

In other embodiments, the number of first angled links in any hinge assembly can be less or more than four. Similarly, the number of second angled links in any hinge assembly can be less or more than four.

Figure 9:
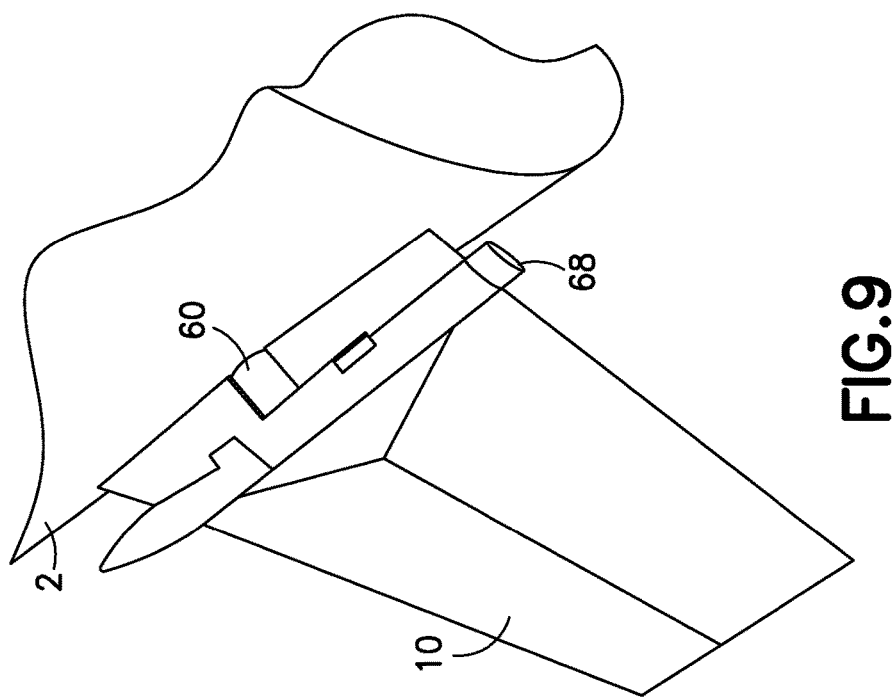
FIG. 9 is a diagram representing an isometric view of one of the control fins of the Harpoon missile depicted in FIG. 1.

FIG. 9 is a diagram representing an isometric view of a control fin 10 of a Harpoon missile of the type depicted in FIG. 1. The fuselage 2 has a longitudinal axis (not shown in FIG. 9), while the folding control fin 10 is movable from a stowed position to a deployed position and is also rotatable about a lateral axis perpendicular to the longitudinal axis. The cylinder 68 at the root of the control fin 10 houses a torque tube (not shown) that is used for deployment actuation. The folding control fin 10 can rotate about an axis of a control cylinder 60 which extends generally perpendicular to the longitudinal axis of the fuselage 2.

The fin deployment mechanism (i.e., the torque tube inside cylinder 68) and control cylinder 60 depicted in FIG. 9 could be replaced by a cylindrical version of the wing hinge mechanism 18 depicted in FIG. 2A or 2B. Such a cylindrical version would be capable of both control fin deployment and active control of the angle of attack of the control fin 10 during flight This would both simplify the number of mechanisms required as well as make the entire system more "low profile" without any blisters, gaps, and other non-stealthy features.

Figure 10:
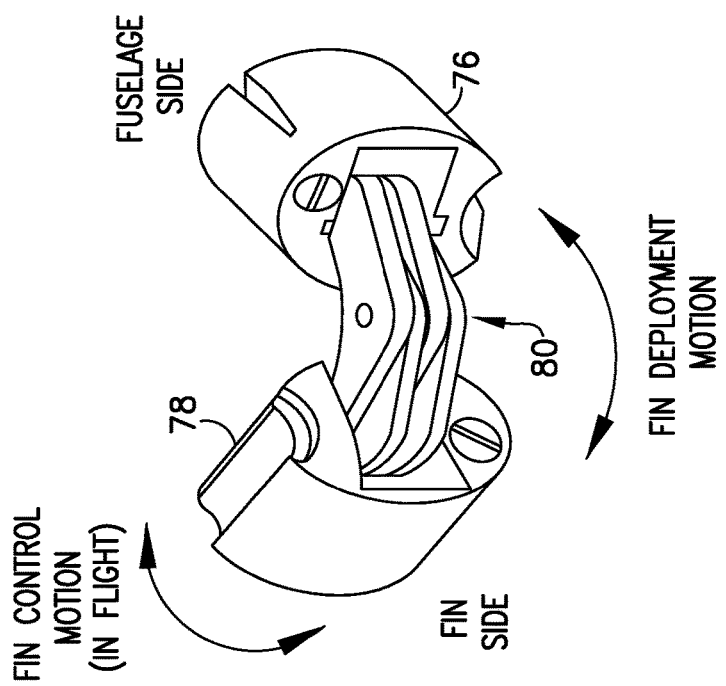
FIG. 10 is a diagram representing an isometric view of a cylindrical version of the wing hinge mechanism disclosed herein.

FIG. 10 is a diagram representing an isometric view of a cylindrical version of a wing hinge mechanism comprising: a cylinder 76 which is housed inside and rotatably coupled to the fuselage 2; a cylinder 78 which is housed inside and fixedly coupled to the folding control fin 10; and a hinge assembly 80 which couples cylinders 76 and 78 to each other. Preferably, the axis of the link coupling pin 24 (see FIG. 2A) would be located where the axis of the torque tube seen in FIG. 9 is located. As cylinder 78 rotates and displaces relative to cylinder 76, the control fin 10 will rotate and displace relative to the fuselage 2 in a similar manner.

For avoidance of doubt, it should be appreciated that the hinge assembly 80 depicted in FIG. 10, although having fewer first angled links and fewer second angled links, may have a construction similar to that shown in FIG. 7A. Moreover, each set of first and second angled links may have the construction depicted in FIG. 2A or 2B, except in the following respects: (a) the first linkage pin 28 (see FIG. 2A) will be affixed to the first cylinder 76 (see FIG. 10); (b) the second linkage pin 32 (see FIG. 2A) will be affixed to the second cylinder 78 (see FIG. 10); (c) the first slider pin 26 (see FIG. 2A) will be slidably coupled to the first cylinder 76 (see FIG. 10); and (d) the second slider pin 30 (see FIG. 2A) will be slidably coupled to the second cylinder 78 (see FIG. 10). In addition, a first linear guide surface is formed in the first cylinder 76 and a second linear guide surface is formed in the second cylinder 78, which linear guide surfaces guide the motion of the first and second slider pins respectively. The missile further comprises a linear actuator (not shown in FIG. 10) configured to cause the coupled ends of the second angled links to displace relative to the first cylinder 76 when the linear actuator is actuated. This linear actuator is housed within the fuselage 2.

While folding wing systems have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

The invention claimed is:

1. An airborne vehicle comprising a fuselage, a folding wing-like structure which is movable from a stowed position to a deployed position, and a hinge mechanism which couples the folding wing-like structure to the fuselage in a manner so that the folding wing-like structure displaces and rotates during movement from the stowed position to the deployed position, wherein the hinge mechanism is housed within outer mold lines of the fuselage and folding wing-like structure and comprises: a first fixed linkage pin attached to the fuselage; a second fixed linkage pin attached to the folding wing-like structure; a link coupling pin; a first angled link having one end rotatably coupled to the first fixed linkage pin, an intermediate portion of the first angled link being coupled to the link coupling pin; and a second angled link having one end rotatably coupled to the second fixed linkage pin, an intermediate portion of the second angled link being coupled to the link coupling pin, at least one of the intermediate portions of the first and second angled links being rotatably coupled to the link coupling pin to allow relative rotation of the first and second angled links.

2. The airborne vehicle as recited in claim 1, further comprising a first linear guide surface formed in the fuselage and a second linear guide surface formed in the folding wing-like structure, wherein the hinge mechanism further comprises: a first link slider pin coupled to the second angled link and a second link slider pin coupled to the first angled link, and further wherein the first link slider pin is displaceable parallel to the first linear guide surface and the second link slider pin is displaceable parallel to the second linear guide surface.

3. The airborne vehicle as recited in claim 2, further comprising a linear actuator configured to cause the first link slider pin to displace relative to the fuselage when the linear actuator is actuated, wherein the linear actuator is housed within the fuselage.

4. The airborne vehicle as recited in claim 2, wherein the first and second linear guide surfaces are slots.

5. The airborne vehicle as recited in claim 1, wherein the fuselage comprises a first cavity, and the airborne vehicle further comprises a locking block which is movable from a first position in the first cavity when the folding wing-like structure is in the stowed position to a second position partly in and partly projecting out of the first cavity when the folding wing-like structure is in the deployed position.

6. The airborne vehicle as recited in claim 5, further comprising a spring arranged to urge the locking block toward the second position.

7. The airborne vehicle as recited in claim 5, wherein the folding wing-like structure comprises a second cavity, and a portion of the locking block projects into the second cavity when the folding wing-like structure is in the deployed position.

8. The airborne vehicle as recited in claim 5, wherein the second cavity has tapered surfaces and the portion of the locking block that projects into the second cavity has tapered surfaces.

9. The airborne vehicle as recited in claim 1, wherein a difference between a first angle of orientation of the folding wing-like structure in the stowed position and a second angle of orientation of the folding wing-like structure in the deployed position is approximately 113 degrees.

10. An airborne vehicle comprising:
 a fuselage;
 a folding wing-like structure which is movable from a stowed position to a deployed position;

a hinge mechanism which couples the folding wing-like structure to the fuselage in a manner so that the folding wing-like structure displaces and rotates during movement from the stowed position to the deployed position, wherein the hinge mechanism comprises:

a first fixed linkage pin having opposed ends attached to the fuselage;

a second fixed linkage pin having opposed ends attached to the folding wing-like structure;

a link coupling pin;

first and second angled links each having one end rotatably coupled to the first fixed linkage pin and an intermediate portion coupled to the link coupling pin; and third and fourth angled links each having one end rotatably coupled to the second fixed linkage pin and an intermediate portion coupled to the link coupling pin, wherein at least two of the first through fourth angled links are rotatably coupled to the link coupling pin to allow concurrent rotation of the first and second angled links relative to the third and fourth angled links.

11. The airborne vehicle as recited in claim 10, further comprising first and second linear guide surfaces formed in the fuselage and third and fourth linear guide surfaces formed in the folding wing-like structure, wherein the hinge mechanism further comprises: a first link slider pin coupled to each of the third and fourth angled links and a second link slider pin coupled to each of the first and second angled links, wherein opposing ends of the first link slider pin are displaceable parallel to the first and second linear guide surfaces respectively, while opposing ends of the second link slider pin are displaceable parallel to the third and fourth linear guide surfaces respectively.

12. The airborne vehicle as recited in claim 11, further comprising a linear actuator configured to cause the first link slider pin to displace relative to the fuselage when the linear actuator is actuated, wherein the linear actuator is housed within the fuselage.

13. The airborne vehicle as recited in claim 10, wherein the fuselage comprises a first cavity, and the airborne vehicle further comprises a locking block which is movable from a first position in the first cavity when the folding wing-like structure is in the stowed position to a second position partly in and partly projecting out of the first cavity when the folding wing-like structure is in the deployed position.

14. The airborne vehicle as recited in claim 13, further comprising a spring arranged to urge the locking block toward the second position.

15. The airborne vehicle as recited in claim 13, wherein the folding wing-like structure comprises a second cavity, and a portion of the locking block projects into the second cavity when the folding wing-like structure is in the deployed position.

16. The airborne vehicle as recited in claim 15, wherein the second cavity has tapered surfaces and the portion of the locking block that projects into the second cavity has tapered surfaces.

17. An airborne vehicle comprising:

a fuselage having a longitudinal axis;

a first cylinder housed inside and rotatably coupled to the fuselage;

a folding control fin which is movable from a stowed position to a deployed position and which is also rotatable about a lateral axis perpendicular to the longitudinal axis;

a second cylinder housed inside and fixedly coupled to the folding control fin; and a hinge mechanism which couples the first and second cylinders in a manner such that the second cylinder is displaceable and rotatable relative to the first cylinder, wherein the hinge mechanism comprises:

a first fixed linkage pin having opposed ends attached to the first cylinder;

a second fixed linkage pin having opposed ends attached to the second cylinder;

a link coupling pin;

a first angled link having one end rotatably coupled to the first fixed linkage pin and an intermediate portion coupled to the link coupling pin; and a second angled link having one end rotatably coupled to the second fixed linkage pin and an intermediate portion coupled to the link coupling pin, wherein at least one of the first and second angled links is rotatably coupled to the link coupling pin to allow rotation of the first angled link relative to second angled link.

18. The airborne vehicle as recited in claim 17, further comprising a first linear guide surface formed in the first cylinder and a second linear guide surface formed in the second cylinder, wherein the hinge mechanism further comprises: a first link slider pin coupled to the second angled link and a second link slider pin coupled to the first angled link, and further wherein the first link slider pin is displaceable parallel to the first linear guide surface and the second link slider pin is displaceable parallel to the second linear guide surface.

19. The airborne vehicle as recited in claim 18, further comprising a linear actuator configured to cause the first link slider pin to displace relative to the first cylinder when the linear actuator is actuated, wherein the linear actuator is housed within the fuselage.

* * * * *